No. 740,559. PATENTED OCT. 6, 1903.
W. E. HAMILTON.
FLEXIBLE CONNECTION FOR DRIVE SHAFTS AND WHEELS.
APPLICATION FILED JAN. 17, 1903.
NO MODEL.

Witnesses:
Roscoe A. Johnson,
S. R. McKelvey.

Inventor,
William E. Hamilton,
By Glenn S. Noble
Att'y.

THE NORRIS PETERS CO., PHOTO-LITHO., WASHINGTON, D. C.

No. 740,559. Patented October 6, 1903.

UNITED STATES PATENT OFFICE.

WILLIAM E. HAMILTON, OF ZANESVILLE, OHIO.

FLEXIBLE CONNECTION FOR DRIVE SHAFTS AND WHEELS.

SPECIFICATION forming part of Letters Patent No. 740,559, dated October 6, 1903.

Application filed January 17, 1903. Serial No. 139,484. (No model.)

*To all whom it may concern:*

Be it known that I, WILLIAM E. HAMILTON, a citizen of the United States, residing at Zanesville, in the county of Muskingum and State of Ohio, have invented certain new and useful Improvements in Flexible Connections for Drive Shafts and Wheels, of which the following is a specification.

This invention relates to means for forming driving-couplings or flexible connections between a rigid drive-shaft and an actuated mechanism adapted to be moved in various directions. More specifically it comprises in combination with a rotatable drive-shaft a drive-wheel adapted to be moved to various positions, means for supporting and driving said wheel from said shaft, and means for supporting mechanism actuated by said wheel. Its objects are to provide a device of this character that will be as rigid as possible, that will transmit power with small percentage of loss, and that will be durable in operation.

Figure 1:
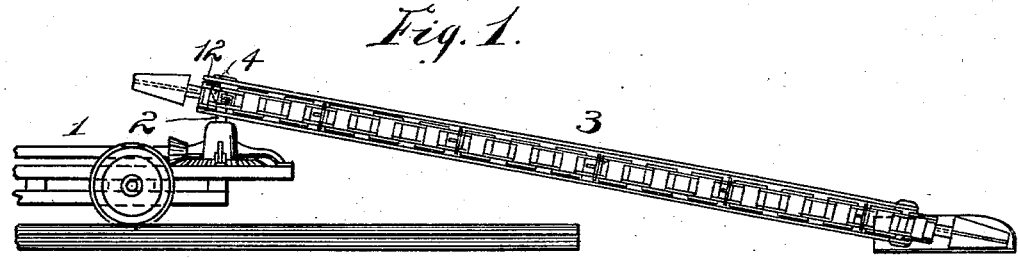
Figure 4:
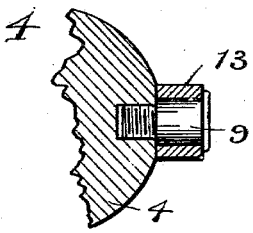
Figure 2:
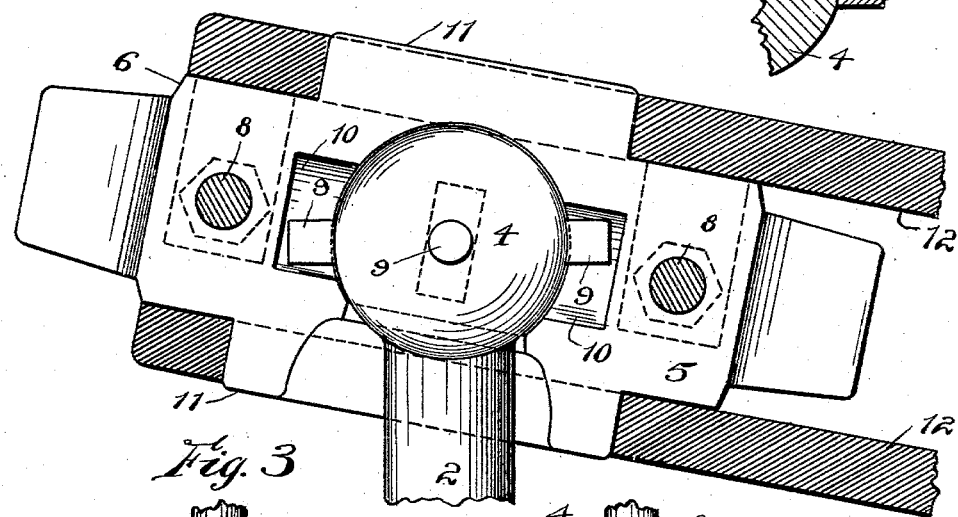
Figure 3:
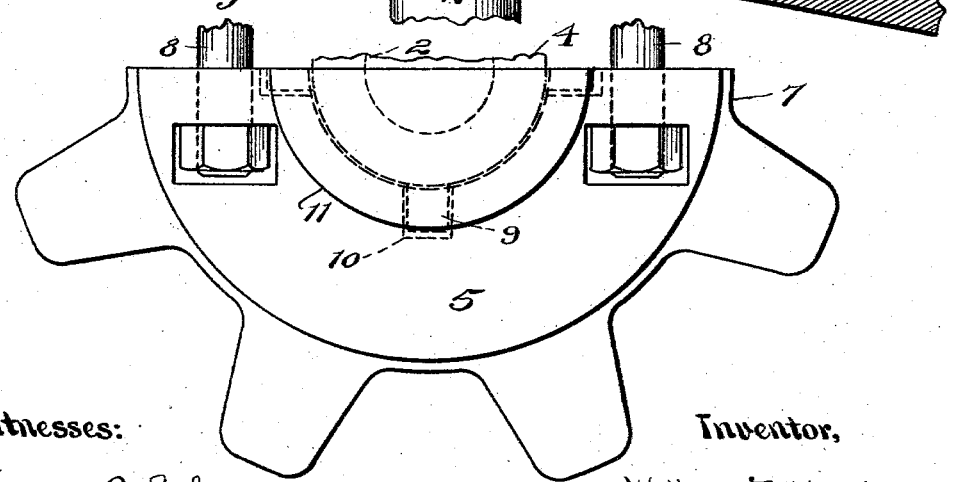

In the drawings, Figure 1 is a view showing a portion of a truck with supports and driving mechanism for a vertical shaft, a gathering and conveying device to be operated, and a flexible coupling for driving the conveyer-chain. Fig. 2 is a sectional view showing a split drive-wheel, which in this instance is a sprocket-wheel, the driving-shaft head and driving-studs, and the chain-supporting bars. Fig. 3 is a part-plan view of the same with the supporting-bars removed. Fig. 4 is a detail showing one of the driving-studs provided with a sleeve to prevent friction.

A truck 1 is provided with suitable driving mechanism for turning a vertical shaft 2, carried in suitable bearings. This shaft in turn supports and drives a gathering and elevating mechanism, (designated as a whole by 3.) The upper extremity of the shaft 2 terminates in a ball or sphere 4, which fits into a similarly-shaped recess in a drive wheel or sprocket 5. For convenience in assembling, this wheel is made in sections 6 and 7, which are held together in any suitable manner, as by bolts 8. A plurality of driving-studs 9 on said ball take into slots 10 radially formed in said wheel and opening into the spherical recess. These slots are of sufficient width to allow a free vertical movement on the studs 9 and are of sufficient height to allow the sweep carrying the elevating mechanism to be moved in a vertical direction, as desired. In order to prevent undue friction, these studs may be provided with sleeves 13, as shown in Fig. 4.

The wheel 5 is provided with journals 11, which turn in bars or bearing-plates 12, forming the end of the sweep, and which is supported at one end by said wheel.

It is evident from the above description and the drawings that if the shaft 2 is turned it will in turn drive the wheel 5, and no further description of the operation is deemed necessary.

While I have described a preferred form or embodiment of this invention, I do not consider the same to be limited to the structural details or exact form shown; but

What I claim, and desire to secure by Letters Patent, is—

1. In a conveyer apparatus, the combination of a vertical drive-shaft, a wheel pivotally mounted on said shaft, means whereby said wheel may be driven by said shaft in planes at variable angles thereto, a conveyer-sweep with one end mounted to coact with said wheel, and conveying mechanism operated by said wheel.

2. In combination, a drive-shaft, a spherical enlargement on said shaft, a wheel taking over said enlargement, studs on said spherical portion taking into recesses in said wheel, a sweep with bearings on said wheel, and conveying mechanism driven by said wheel.

3. In combination, a drive-shaft a ball on said shaft, a sprocket-wheel taking over said ball, studs on said ball adapted to engage slots in said wheel, antifriction-rollers on said studs, journals on said wheel, a sweep engaging said journals and conveying mechanism coacting with said sweep and driven by said sprocket-wheel.

4. A vertical drive-shaft terminating in a spherical head, a separable sprocket-wheel provided with a recess for said ball, studs on said ball, slots in said sprocket-wheel with which said studs engage, journals on said wheel, a sweep with bearings on said journals and conveying mechanism operated by said sprocket-wheel.

WILLIAM E. HAMILTON.

Witnesses:
J. F. LINTON,
O. E. HALTERMAN.